United States Patent
Vig et al.

(10) Patent No.: US 11,556,540 B1
(45) Date of Patent: Jan. 17, 2023

(54) TRANSMISSION FORMAT CACHE FOR DATABASE READS (71) Applicant: Amazon Technologies, Inc., Seattle, WA (US)

(72) Inventors: Akshat Vig, Seattle, WA (US); Akhilesh Mritunjai, Seattle, WA (US); Somasundaram Perianayagam, Seattle, WA (US); James Christopher Sorenson, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 16/830,151

(22) Filed: Mar. 25, 2020

(51) Int. Cl.
G06F 16/2455 (2019.01)
G06F 16/25 (2019.01)
G06F 16/23 (2019.01)

(52) U.S. Cl.
CPC .... *G06F 16/24552* (2019.01); *G06F 16/2379* (2019.01); *G06F 16/258* (2019.01)

(58) Field of Classification Search
CPC .................................................. G06F 16/24552
See application file for complete search history.

(56) References Cited

U.S. PATENT DOCUMENTS

| 6,374,305 | B1 | 4/2002 | Gupta et al. |
| 7,526,481 | B1 | 4/2009 | Csson et al. |
| 9,639,562 | B2 | 5/2017 | Raitto et al. |
| 2017/0132130 | A1* | 5/2017 | Ramakrishnan .... G06F 12/0815 |
| 2018/0081852 | A1* | 3/2018 | Kunkel ................ H04L 67/568 |
| 2018/0275898 | A1* | 9/2018 | Bhansali ............. G06F 12/0871 |
| 2019/0065560 | A1* | 2/2019 | Rojkov ............... G06F 16/2272 |
| 2019/0155937 | A1* | 5/2019 | Barve ..................... G06F 16/27 |
| 2020/0296451 | A1* | 9/2020 | Hassler ................ H04N 21/442 |

* cited by examiner

Primary Examiner — Van H Oberly
(74) Attorney, Agent, or Firm — Robert C. Kowert; Kowert, Hood, Munyon, Rankin & Goetzel, P.C.

(57) ABSTRACT

A transmission format cache may be implemented at a database storage node. Versions of data items stored in a database at the database storage node may be processed according to anticipated access requests to generate an anticipated access responses. The anticipated access responses are then stored in a transmission format cache to provide low latency reads of the data items. The versions of the data items may be processed as a result of updates to the database items. The database storage node may be one of a plurality of database storage nodes implementing a distributed database system with the transmission format cache implementing a portion of a distributed response cache providing low latency, eventually consistent or consistent reads of data items in a distributed database.

20 Claims, 9 Drawing Sheets

TRANSMISSION FORMAT CACHE FOR DATABASE READS

BACKGROUND

Database systems may organize database storage in various ways in order to optimize varying workloads. As a result, particular data items stored in the database in a format for optimization may have to be reformatted by the database system in order to return the data items to clients of the database. For example, some databases may be organized such that certain attributes of data items are grouped together so that various attributes of a data item may be collected from different areas of storage in order to return the data item on request.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

A reference herein to a patent document or any other matter identified as prior art, is not to be taken as an admission that the document or other matter was known or that the information it contains was part of the common general knowledge as at the priority date of any of the claims.

DETAILED DESCRIPTION

Modern database systems may organize database storage in various ways in order to optimize varying workloads. As a result, particular data items may be stored in a format optimized for processing by the database system, which may in turn have to be reformatted in order to return the data items to clients of the database responsive to access requests. For example, some databases may be organized such that certain attributes of data items are grouped together, so that various attributes of a data item may be collected from different areas of storage in order to return the data item on request. In another example, data stored in a database may be organized to optimize for underlying hardware or software, and in yet another example, access to data items by clients of a database may be made through programmatic interfaces, such as application programming interfaces (APIs) or RESTful (Representational State Transfer or REST) web services, that specify data formatting for transfer that is not well suited for storage within the database system.

Database systems, therefore, often process data stored in a database in a format optimized for database storage in order to generate data in a different, response format suitable for transmission over a network to clients of the database system and this gives rise to a need for highly performant techniques implementing reads of data items in such database systems. The techniques described herein may be employed in various combinations and in various embodiments to implement a transmission format cache in a database node, database system or distributed database system, according to some embodiments.

This specification begins with a general description of a database service that may implement a transmission format cache. Then various examples of a database service are discussed, including different components/modules, or arrangements of components/module, that may be employed as part of implementing the database service, in various embodiments. A number of different methods and techniques to implement a transmission format cache in a database system are then discussed, some of which are illustrated in accompanying flowcharts. Finally, a description of an example computing system upon which the various components, modules, systems, devices, and/or nodes may be implemented is provided. Various examples are provided throughout the specification.

Figure 1:
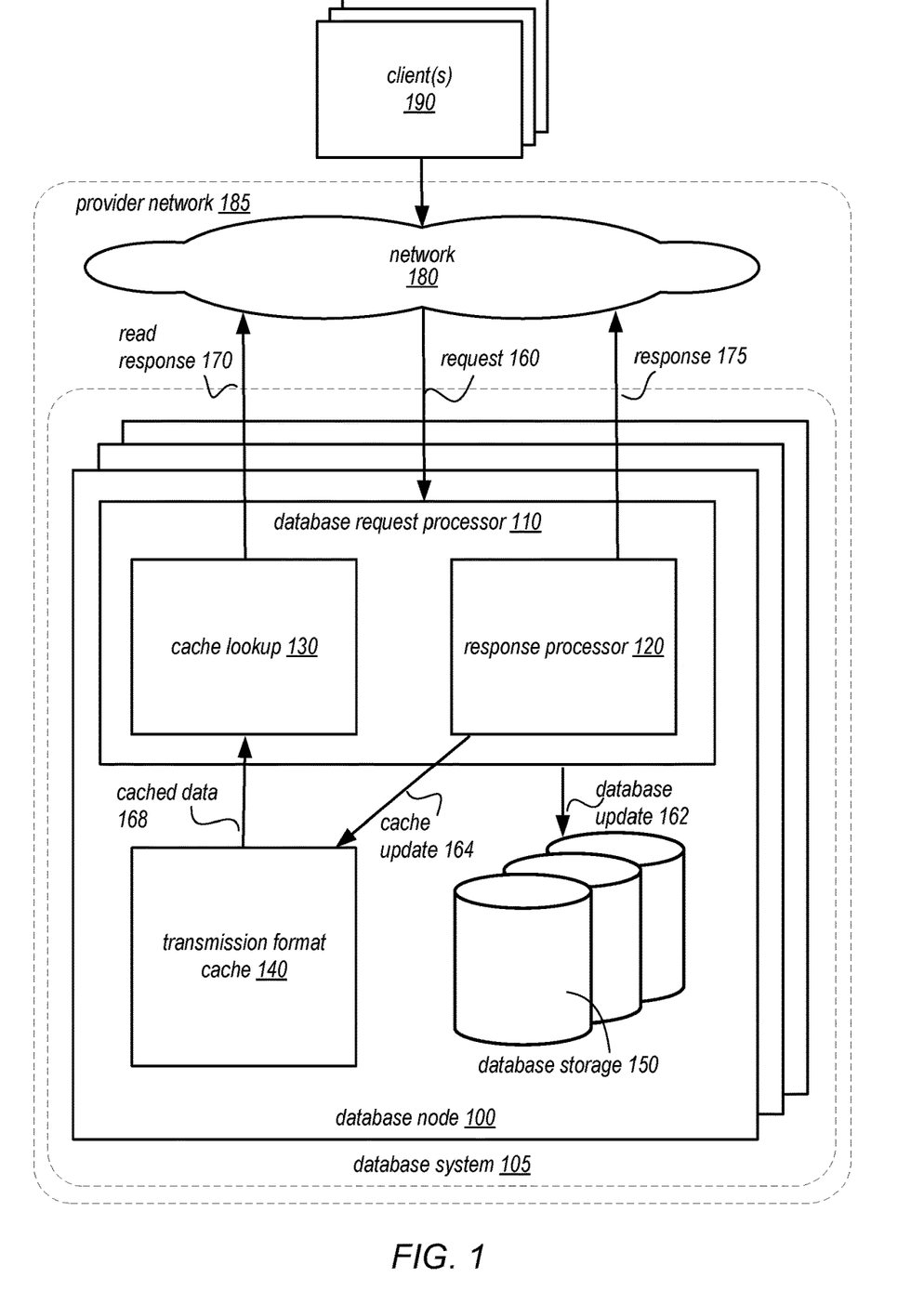
FIG. 1 is a logical block diagram illustrating a database node implementing a transmission format cache, according to some embodiments.

FIG. 1 is a logical block diagram illustrating a database node implementing such a transmission format cache, according to some embodiments. In the various embodiments described herein, transmission format may refer to a characteristic of having data formatted to be ready to transmit as a response to an access request. While, such transmission may occur over a wired network in some embodiments, as such responses may be transmitted over any number of ways in other embodiments using any number of possible communication technologies, including for example, wired and wireless network interfaces, local I/O interfaces, communication buses or fabrics, and input/output devices as shown below in FIG. 9.

In various embodiments, the components illustrated in FIG. 1 may be implemented directly within computer hardware, as instructions directly or indirectly executable by computer hardware (e.g., a microprocessor or computer system), or using a combination of these techniques. For example, the components of FIG. 1 may be implemented by a system that includes a number of computing nodes (or simply, nodes), in one embodiment, each of which may be similar to the computer system embodiment illustrated in FIG. 9 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Figure 9:
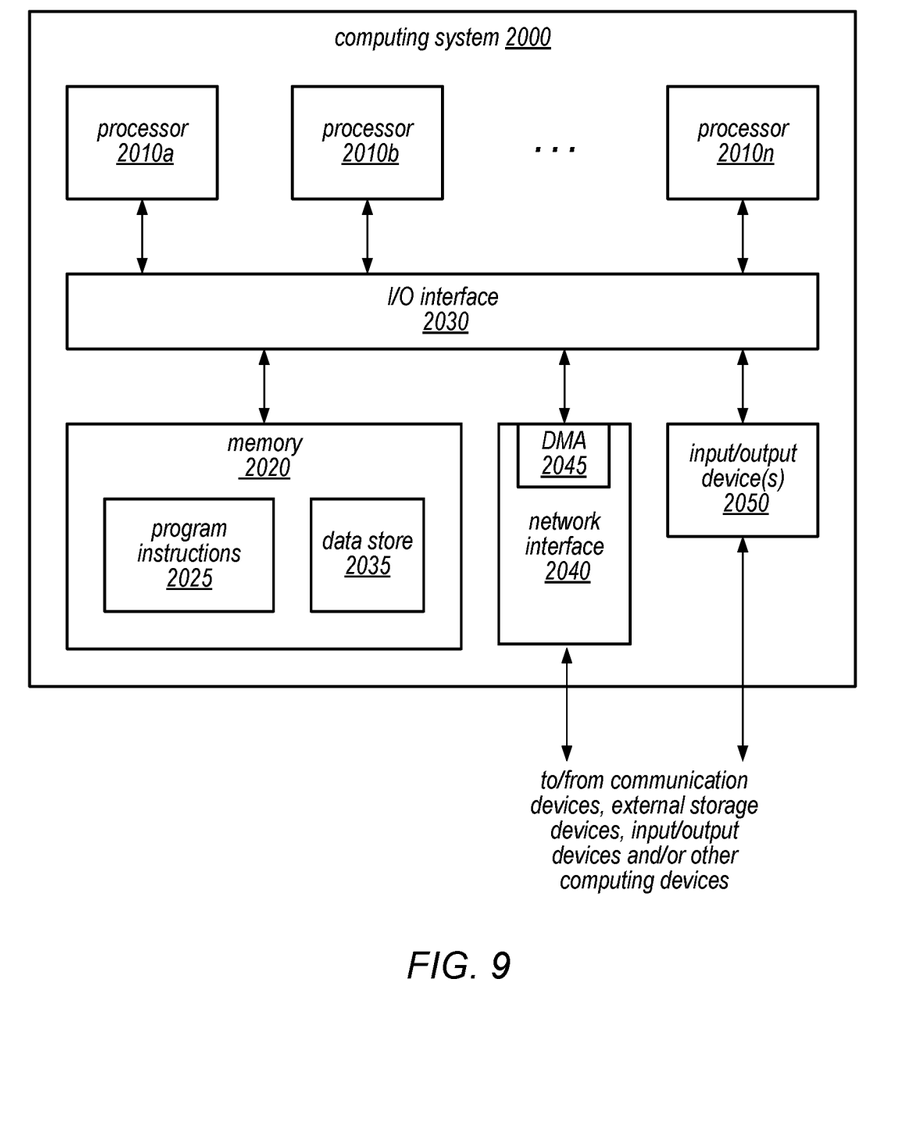
FIG. 9 is a block diagram illustrating an example computing system, according to some embodiments.

A database node 100 may include a database request processor 110 that provides access to a database stored in database storage 150, in various embodiments. This database node, in some embodiments, may be implemented on a single computing system 2000, as shown in FIG. 9, while in other embodiments the database node 100 may be implemented on a plurality of such systems 2000 and may divide various components of the database node among the plurality of systems in various ways. In some embodiments, the database system 105 may be implemented on a single database node 100 while in other embodiments a plurality of database nodes 100 may collectively implement a distributed database system 105 which may further include additional hardware such as routers, switches, load balancers, proxy servers, etc. (not shown). The database system 105 may further be implemented as part of a provider network 185 in some embodiments.

Provider network 185 may be a private or closed system, in one embodiment, or may be set up by an entity such as a company or a public sector organization to provide one or more services (such as various types of cloud-based storage) accessible via the Internet and/or other networks to clients 190, in another embodiment. In one embodiment, provider network 185 may be implemented in a single location or may include numerous data centers hosting various resource pools, such as collections of physical and/or virtualized computer servers, storage devices, networking equipment and the like (e.g., computing system 2000 described below with regard to FIG. 9), needed to implement and distribute the infrastructure and storage services offered by the provider network 185. In one embodiment, provider network 185 may implement various computing resources or services, such as database service(s) 105 (e.g., relational or non-relational (NoSQL) database query engines), and other services (not illustrated), such as a map reduce service, data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

Database node 100 may include various types of database services, in one embodiment, (both relational and non-relational) for storing, querying, and updating data. Such services may be enterprise-class database systems that are highly scalable and extensible. In one embodiment, queries may be directed to a database that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database node 100 may provide a RESTful programmatic interface in order to submit access requests (e.g., to get, insert, delete, or query data). In one embodiment, database node 100 may also include various types of data processing services that implement or allow transactions.

In one embodiment, clients 190 may encompass any type of client configurable to submit network-based requests via network 180, including requests for database node 100 (e.g., to perform a transaction to a database hosted in database system 105). For example, in one embodiment a given client 190 may include a suitable version of a web browser, or may include a plug-in module or other type of code module that executes as an extension to or within an execution environment provided by a web browser. Alternatively in a different embodiment, a client 190 may encompass an application such as a database client/application (or user interface thereof), a media application, an office application or any other application that may make use of a database in database system 105 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 190 may be an application that interacts directly with network 180, in one embodiment. In one embodiment, client 190 may generate network-based services requests according to a Representational State Transfer (REST)-style network-based services architecture, a document- or message-based network-based services architecture, or another suitable network-based services architecture. Note that in some embodiments, clients of database system 105 may be implemented within provider network (not shown) (e.g., as applications hosted on a virtual compute service).

In one embodiment, a client 190 may provide access to database system 105 to other applications in a manner that is transparent to those applications. For example, client 190 may integrate with a database on database system 105. In such an embodiment, applications may not need to be modified to make use of the database system 105. Instead, the details of interfacing to a database may be coordinated by client 190.

Client(s) 190 may convey network-based services requests to and receive responses from database system 105 via network 180, in one embodiment. In one embodiment, network 180 may encompass any suitable combination of networking hardware and protocols necessary to establish network-based-based communications between clients 190 and database system 105. For example, network 180 may encompass the various telecommunications networks and service providers that collectively implement the Internet. In one embodiment, network 180 may also include private networks such as local area networks (LANs) or wide area networks (WANs) as well as public or private wireless networks. For example, a given client 190 may be provisioned within enterprises having their own internal networks. In such an embodiment, network 180 may include the hardware (e.g., modems, routers, switches, load balancers, proxy servers, etc.) and software (e.g., protocol stacks, accounting software, firewall/security software, etc.) necessary to establish a networking link between given client(s) 180 and the Internet as well as between the Internet and database system 105. It is noted that in one embodiment, client(s) 190 may communicate with database system 105 using a private network rather than the public Internet.

Database node 100 may implement request processing using database request processor 110, in one embodiment. Request processing may create, update, define, query, and/or otherwise administer databases, in one embodiment. For instance, request processing may maintain a database according to a database model (e.g., a relational or non-relational database model). In one embodiment, request processing may allow a client to manage data definitions (e.g., Data Definition Language (DDL) requests to describe column definitions, requests to add item attributes, etc.). In one embodiment, request processing may handle requests to access the data (e.g., to perform transactions, to insert, modify, add, or delete data, and requests to query for data by generating query execution plans to determine which partitions of a database may need to be evaluated or searched in order to service the query). In one embodiment, request processing may also perform other management functions, such as enforcing access controls or permissions, concurrency control, or recovery operations.

In one embodiment, database service 105 may provide functionality for creating, accessing, and/or managing tables at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 1. Note also that in one embodiment, one or more database nodes 100 process access requests 160 on behalf of clients 190 directed to database tables. Some of these processing nodes may operate as if they were in a multi-tenant environment, and others may operate as if they were in a single-tenant environment. In some embodiments, database nodes 100 that operate as in a multi-tenant environment may be implemented on different processing nodes (or on different virtual machines executing on a single host) than processing nodes that operate as in a single-tenant environment.

In addition to dividing or otherwise distributing data (e.g., database tables) across database nodes 100 in separate partitions, database nodes 100 may also be used in multiple different arrangements for providing resiliency and/or durability of data as part of larger collections or groups of resources. A replica group, for example, may be composed of a number of storage nodes maintaining a replica of a particular portion of data (e.g., a partition of a table) for the database service 105. Moreover, different replica groups may utilize overlapping nodes, where a database node 100 may be a member of multiple replica groups, maintaining replicas for each of those groups whose other database node 100 members differ from the other replica groups.

Different models, schemas or formats for storing data for database tables in database service 105 may be implemented, in some embodiments. For example, in some embodiments, a relational data model that stores database tables structured as rows with fields for a defined number of columns may be implemented. In some embodiments, non-relational (e.g., NoSQL), key-value, or semi structured data may be implemented. In at least some embodiments, the data model may include tables containing items that have one or more attributes. In such embodiments, each table maintained on behalf of a client 190 may include one or more items, and each item may include a collection of one or more attributes. The attributes of an item may be a collection of one or more key (or key)-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 105 (and the underlying storage system) may have no pre-defined schema other than their reliance on the primary key, in some embodiments. In some embodiments, items in a table may include attributes that are either system data or application data.

Database service 105 may provide an application programming interface (API) for requesting various operations targeting tables, caches, indexes, items, and/or attributes maintained on behalf of storage service clients. These APIs provided by database service 105 (and/or the underlying system) may be used to manipulate table-level entities, such as tables and indexes and/or to re-configure various tables These APIs may be called relatively infrequently when compared to other APIs. In some embodiments, the APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. Other APIs provided by database service 105 (and/or the underlying system) may be used to perform item-level operations, such as transactions, storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 105 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 105 (and/or underlying system) described herein may provide various APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

In some embodiments, database request processor 110 may receive a request 160 from a client 190 to perform a write or update to a data item of a database table. The write request 160 may include at least a portion of the data item to be updated. To perform the write request 160, the database request processor may generate a current version of the data item using data contained in the write request 160 alone or in combination with data for the data item contained in database storage 150. Once the version of the data item is generated, the data item may be updated at database storage 150 as shown in 162.

In addition, in some embodiments request processor 120 may process the data item to convert from a database storage format to a transmission format. This processing may include encrypting the data for a particular client 190 and/or compressing the data. The request processor 120 may then update transmission format cache 140 with the data item in the transmission format as shown in 164. This update may occur coupled to the database update 162 in some embodiments or may be decoupled from the database update 162 in other embodiments, resulting in consistent and eventually consistent read behaviors respectfully. This updating of the transmission format cache 140 is disclosed in further detail in FIG. 2 below.

In some embodiments, transmission format cache 140 may be enabled for a database table by a client 190 using an API provided by database service 105. Client 190 may control the transmission format cache 140 for multiple database tables independently, resulting in the transmission format cache 140 being enabled for some database tables and disabled for other database tables. Client 190 may also disable a database table using an API provided by database service 105, in some embodiments. Using transmission format cache control APIs, client 190 may dynamically control caching of transmission format data for each database table to adapt to performance requirements, in some embodiments.

In some embodiments, database request processor 110 may receive a request 160 from a client 190 to perform a read access of a data item of a database table. To perform the read request 160, the database request processor 110 may perform a cache lookup operation in the cache lookup 130. If database request processor 110 determines that an entry exists in the transmission format cache 140 matching the read request 160, database request processor 110 may read the cached data 168 in the transmission format from the transmission format cache 140 and complete the read request 160 by sending the cached data 168 in the transmission format to the client 190. This data item read request is disclosed in further detail in FIG. 3 below.

Figure 2:
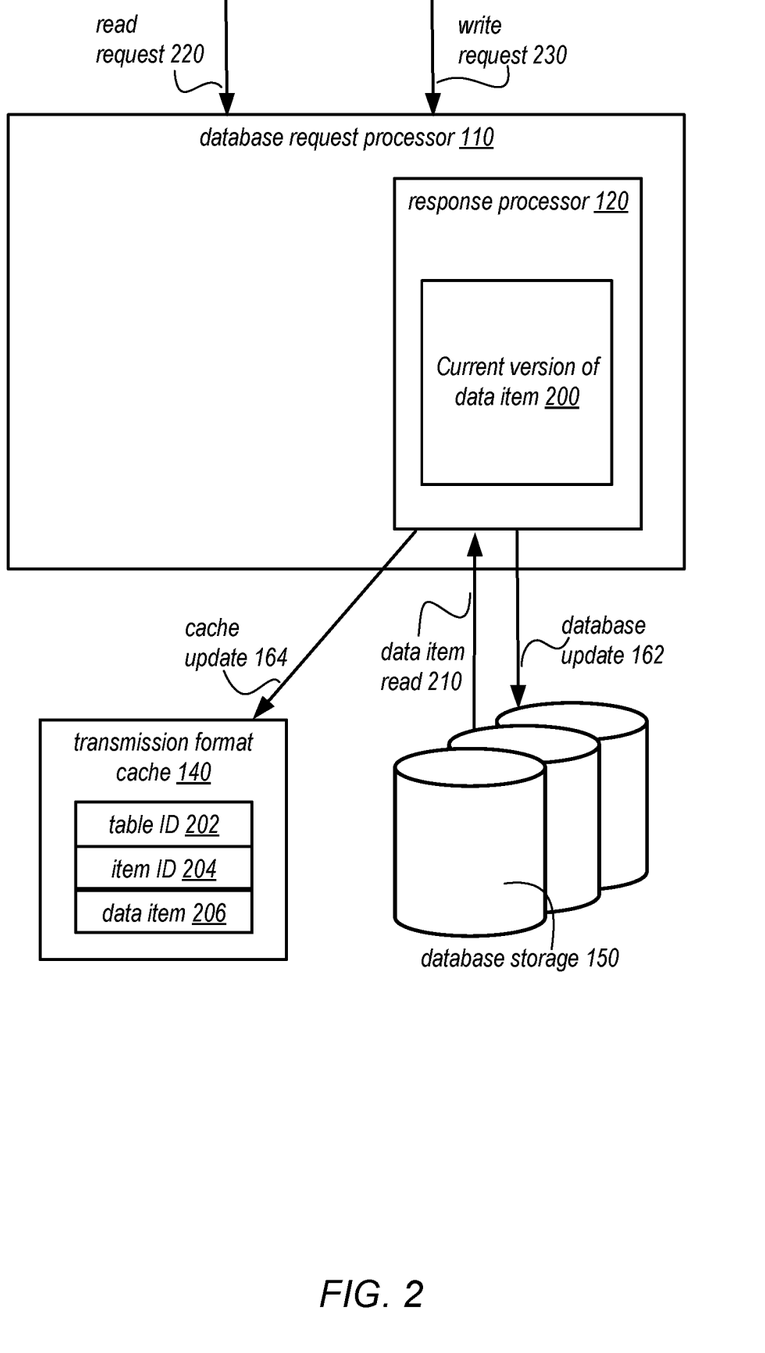
FIG. 2 is a logical block diagram illustrating a database node implementing an update to transmission format cache, according to some embodiments.

FIG. 2 is a logical block diagram illustrating a database node implementing an update to transmission format cache, according to some embodiments. Database request processor 110 may obtain or generate a current version of a data item 200 in the response processor 120. This current version of a data item 200 may be obtained or generated through a variety of means. For example, the version of a data item 200 may be generated, in some embodiments, as part of an update request processed by database request processor 110 as discussed above in FIG. 1. The version of a data item 200 may also be obtained, in some embodiments, as a result of a read request processed by database request processor 110 while in still other embodiments the version of a data item 200 may be obtained as part of a prefetch or speculative read operation from database storage 150.

Once the version of a data item 200 is obtained, the database request processor 110 may convert the data item 200 from a database storage format to a transmission format and update transmission format cache 140 with the data item 200 in the transmission format as shown in 164. To update the transmission format cache 140, the database request processor 110 may generate a cache entry that includes a data item 200 in the transmission format as well as information needed to determine a match with an access request. This information may include an identifier of the data item in some embodiments and may also include one or more identifiers of the database table in other embodiments. In addition, the information may include one or more additional data item identifiers that may be used to identify future database update request that may affect, or for the invalidation of, the cache entry.

For example, a request for update of a data item of a database table may be received from a client 190 at the database request processor 110. Responsive to this request, the database request processor 110 may generate a current version of the data item and process the data item to convert the data item from a database storage format to a transmission format, generating a cache entry that includes the data item 206 in a transmission format, an identifier for the database table 202 and an identifier for the item 204. The database request processor 110 may then update the transmission format cache 140 with this cache entry. Those skilled in the art will appreciate that this example is merely illustrative and are not intended to limit the scope of the embodiments as described herein.

Transmission format cache 140 may be implemented in various ways in various embodiments. For example, in some embodiments transmission format cache 140 may be implemented in memory 2020 of the database node 100 while in other embodiments it may also use dedicated persistent storage (input/output devices 2050) of the database node 100. Within memory 2020, transmission format cache 140 may use a separate address space or dedicated range of memory 2020 so as to avoid interactions with other components of the data request processor 110 through interactions with shared stack or heap memory. In some embodiments, the transmission format cache 140 may use separate ranges of memory to store response information and cache entry lookup information. Those skilled in the art will appreciate that these examples are merely illustrative and are not intended to limit the scope of the embodiments as described herein.

Figure 3:
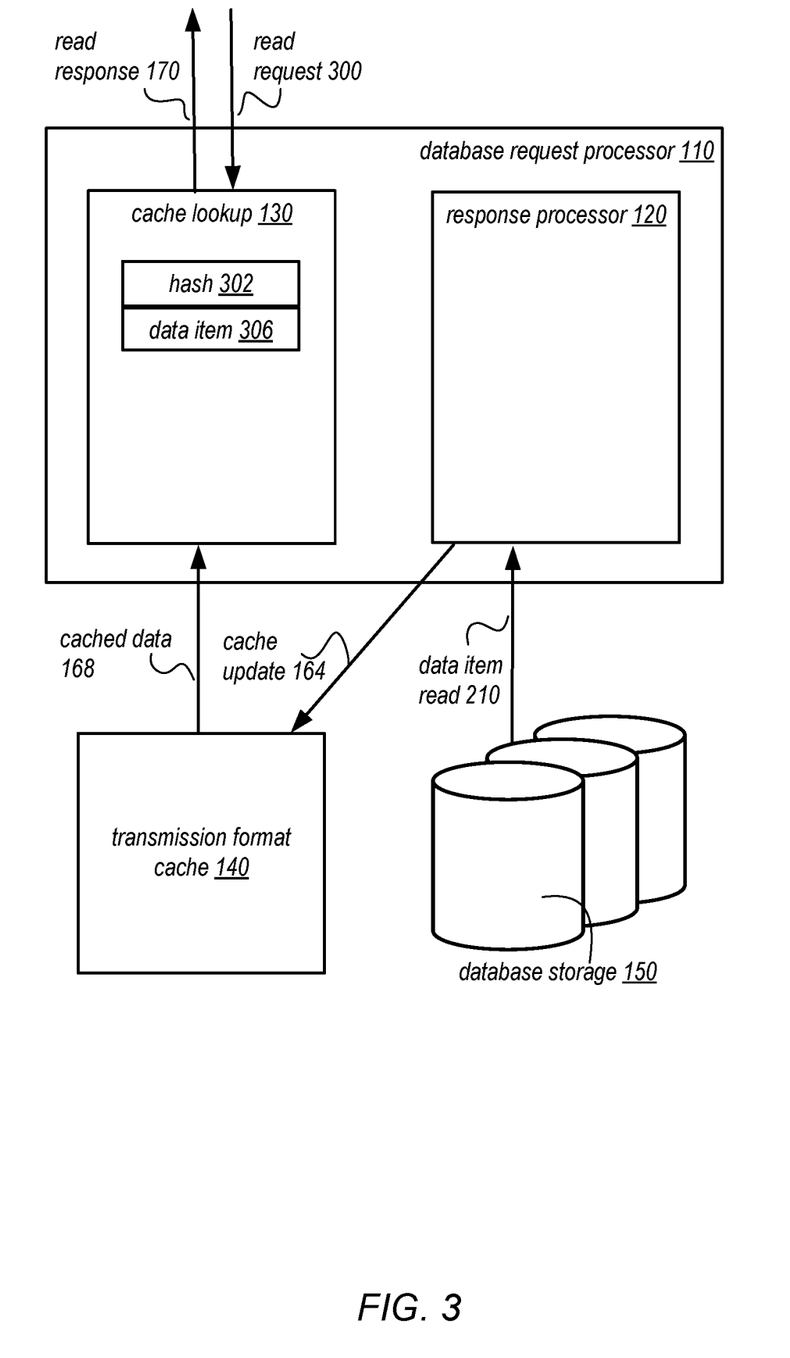
FIG. 3 is a logical block diagram illustrating a database node implementing a read from a transmission format cache, according to some embodiments.

FIG. 3 is a logical block diagram illustrating a database node implementing a read from a transmission format cache, according to some embodiments. Database request processor 110 may receive a request for read access 300 for a data item in a database table. Responsive to this received request, cache lookup module 130 may determine that the data item of the received access request 300 matches a cache entry of transmission format cache 140 by comparing information provided in the access request 300, or information derived from information provided in the access request 300, to information contained within the cache entry.

For example, a request for read access of a data item of a database table may be received from a client 190 at the database request processor 110. Responsive to this request, the database request processor 110 may generate a hash using a database table ID and item ID contained in the received request and compares this to the hash 302 of cache entries of the transmission format cache 140. Responsive to identifying a cache entry with a hash 302 matching the generated hash, the database request processor 110 may identify data item 306 in a transmission format as suitable for sending to the client to complete the read access request. Those skilled in the art will appreciate that this example is merely illustrative and are not intended to limit the scope of the embodiments as described herein.

Should the cache lookup module 130 determine that the data item of the received access request 300 matches a cache entry of transmission format cache 140, the database request processor may send the data item 306 in a transmission format of the matching cache entry to complete the received access request. In some embodiments, should the cache lookup module 130 determine that the received access request 300 does not match any cache entry of transmission format cache 140, the database request processor 110 may perform the access request 300 by reading the data item 210 from database storage 150, converting the data item 210 from a database storage format to a transmission format in the response processor 120 and sending the generated response to complete the received access request. In the event a data item is converted due to no matching cache entry being identified, the database response processor 110 may, in some embodiments, update the transmission format cache 140 using the converted data item as described above in FIG. 2.

Figure 4:
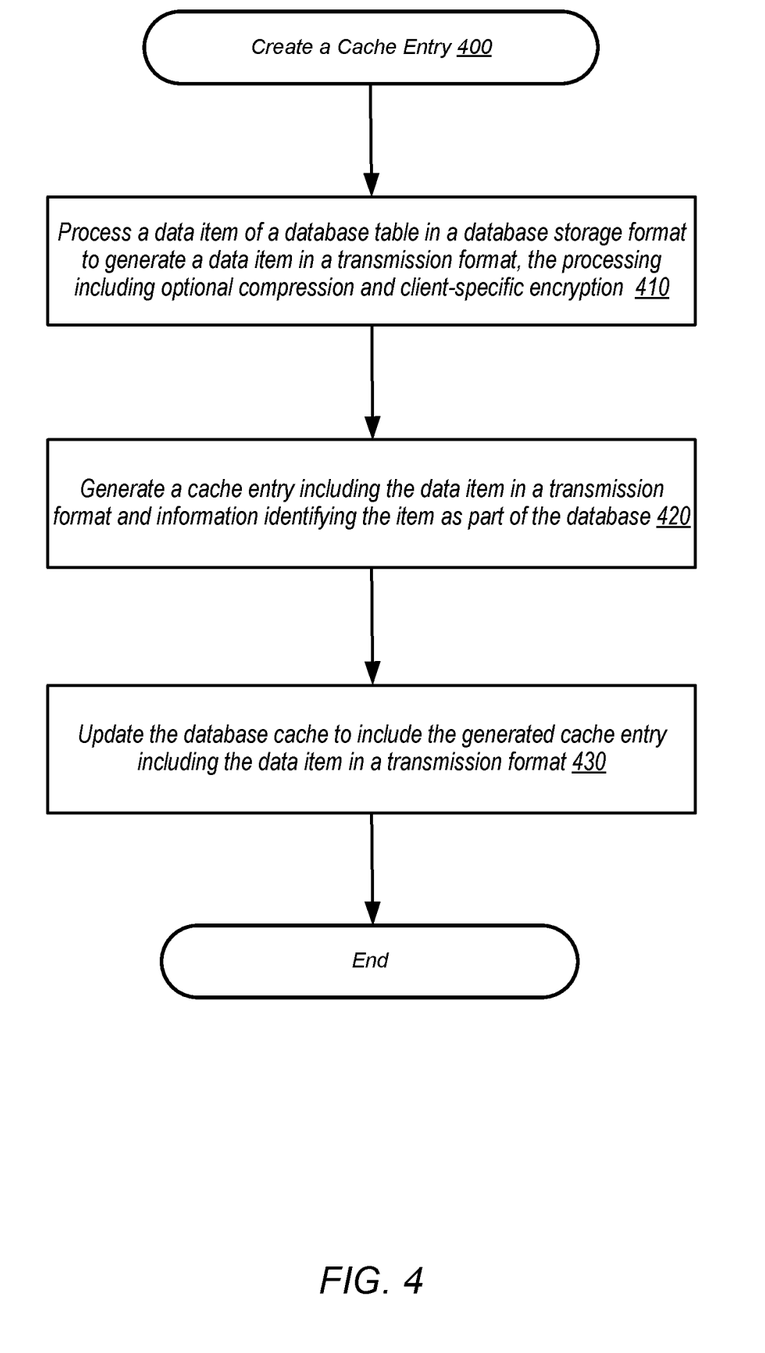
FIG. 4 is a high-level flowchart illustrating various methods and techniques to implement creating an entry in a transmission format cache, according to some embodiments.

FIG. 4 is a high-level flowchart illustrating various methods and techniques to implement creating an entry in a transmission format cache 400, according to some embodiments. As identified in 410, in some embodiments a database request processor, such as the database request processor 110 as disclosed in FIG. 1, may generate a data item 200 in a transmission format for an anticipated access request. The data item may be obtained through various means, in some embodiments, including for example, as a result of a write or update of the data item, a read of the data item, or a speculative read of the data item. Those skilled in the art will appreciate that these examples are merely illustrative and is not intended to limit the scope of the embodiments as described herein. To generate the data item 200 in a transmission format, the database request processor 110 may optionally encrypt the data item for a particular client 190 and/or compress the data, in some embodiments.

As indicated on 420, once the data item is converted from a database storage format to a transmission format, the database request processor may in some embodiments generate a cache entry for the data item. This cache entry may include the data item in a transmission format as well as information to identify the data item of the database. In various embodiments, this information may include a variety of different kinds of information. In some embodiments, a database system, such as the database system 100 as disclosed in FIG. 1, may include a transmission format cache, such as the transmission format cache 140 as disclosed in FIG. 1, to support multiple database tables or partitions of multiple database table while in other embodiments the database system may include a transmission format cache to support a single database table or partition. Thus in various embodiments, the information may include, in addition to an identifier of the data item, additional identifiers of database tables or partitions. Furthermore, in some embodiments, the information may include an indicator such as a hash value that is computed based on one or more identifiers. Those skilled in the art will appreciate that these examples are merely illustrative and is not intended to limit the scope of the embodiments as described herein.

As indicated on 430, once a cache entry is generated, the database request processor may update the transmission format cache. In some embodiments, the transmission format cache may be implemented in a single portion of memory or storage on the database node while in other embodiments, the transmission format cache may implement separate memories for response storage and information storage. Therefore, updates of the transmission format cache in some embodiments may be implemented by storing information in a single region of memory or storage associated with a cache entry while in other embodiments locations in multiple memories may be performed. Those skilled in the art will appreciate that these examples are merely illustrative and is not intended to limit the scope of the embodiments as described herein. Once the transmission format cache has been updated, the cache entry has been created.

Figure 5:
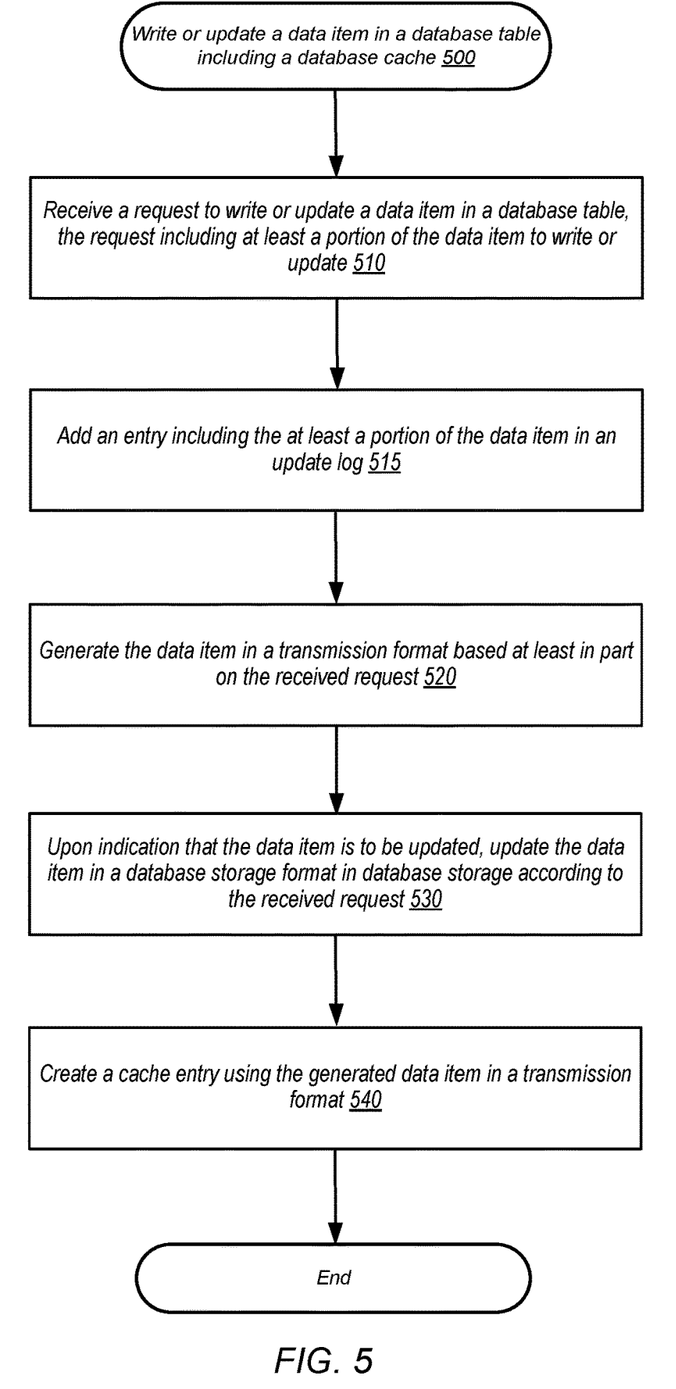
FIG. 5 is a high-level flowchart illustrating various methods and techniques to implement writing or updating a data item in a database system including a transmission format cache, according to some embodiments.

FIG. 5 is a high-level flowchart illustrating various methods and techniques to implement writing or updating a data item in a database system including a transmission format cache 500, according to some embodiments. As identified in 510, in some embodiments a database request processor, such as the database request processor 110 as disclosed in FIG. 1, may receive a request to write or update a data item in a database table, such as the write request 230 as disclosed in FIG. 2, the request including at least a portion of the data item.

As shown in 515, in some embodiments the database system may store portions of a distributed database for a distributed database system such as the database system 105 shown in FIG. 1. In some embodiments, the request to write or update a data item may be part of a distributed write or update operation involving multiple database systems. In some embodiments a database request processor may add an entry including the data item, or portion of the data item, into an update log as part of a two-phase commit operation for the distributed write or update operation.

As shown in 520, the database request processor may then generate as current version of the data item based at least in part on the received request. In some embodiments, this version of the data item may be generated as part of updating database storage as disclosed in 530. In other embodiments, the version of the data item may be generated based entirely on data included in the received request, while in still other embodiments the version of the data item may be generated using data of the received request in combination with at least a portion of the data item read from database storage. Those skilled in the art will appreciate that these examples are merely illustrative and is not intended to limit the scope of the embodiments as described herein. Once the transmission format cache has been updated, the cache entry has been created.

As shown in 530, the database request processor may update database storage, such as database storage 150 as disclosed in FIG. 1, according to the received request. In some embodiments the database system may store portions of a distributed database for a distributed database system such as the database system 105 shown in FIG. 1, and the received request may be part of a distributed write or update operation involving multiple database systems. As performance of the request may employ a two-phase commit operation, the update of the data item in database storage may wait for a signal to commit the data item to database storage, in some embodiments.

In some embodiments, the update may include modifying one or more locations on the database storage with portions of the data item. In other embodiments, the update may include generating a current version of the data item and replacing the data item stored in database storage with the current version. In still other embodiments, this update may be performed by submitting an update request to the database storage. Those skilled in the art will appreciate that these examples are merely illustrative and is not intended to limit the scope of the embodiments as described herein. Once the transmission format cache has been updated, the cache entry has been created.

As indicated on 540, once the version of the data item is generated, a cache entry may be created in some embodiments using the generated current version of the data item following the various methods and techniques disclosed in FIG. 4. Once the transmission format cache has been updated, the cache entry has been created.

Figure 6:
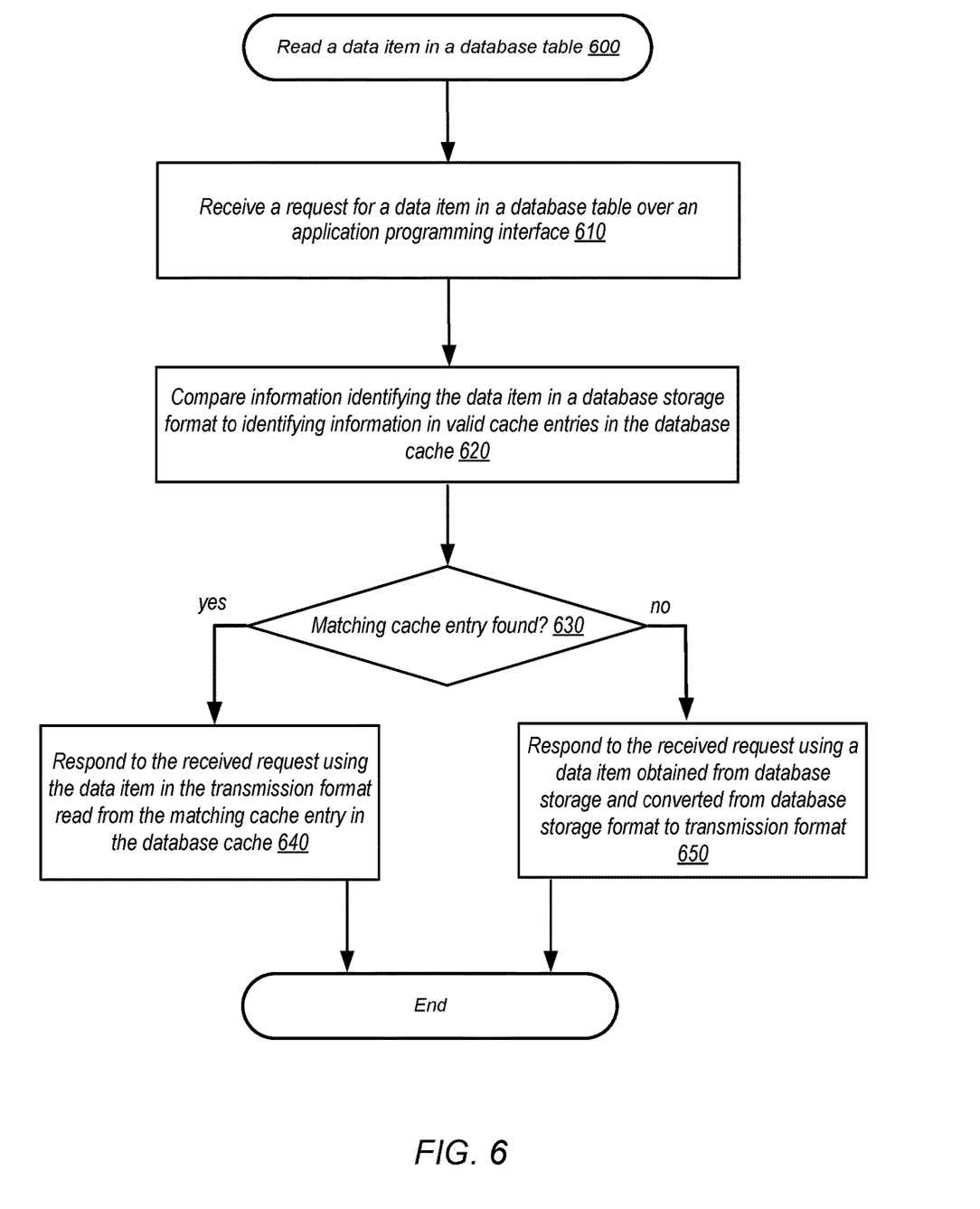
FIG. 6 is a high-level flowchart illustrating various methods and techniques to implement completing a read access request using a transmission format cache, according to some embodiments.

FIG. 6 is a high-level flowchart illustrating various methods and techniques to read a data item in a database table using a transmission format cache 600, according to some embodiments. As identified in 610, in some embodiments a database request processor, such as the database request processor 110 as disclosed in FIG. 1, may receive a request for read access for a data item in a database table. As shown in 620, a cache lookup module of the database request processor, such as cache lookup 130 as disclosed in FIG. 1, may in some embodiments compare information identifying the data item of the database to information identifying the data item in transmission format for which cache entries in a transmission format cache, such as transmission format cache 140 as disclosed in FIG. 1, exist.

For example, a request for read access of a data item of a database table may be received from a client, such client 190 as disclosed in FIG. 1, at the database request processor. Responsive to this request, the database request processor generates a hash using a database table ID and item ID contained in the received request and compares this to hashes, such as hash 302 as disclosed in FIG. 3, of cache entries of the transmission format cache to determine in an entry in the transmission format cache matches the received request. Those skilled in the art will appreciate that this example is merely illustrative and are not intended to limit the scope of the embodiments as described herein.

As identified in 630, should no matching cache entry be found, the received access request may be completed, as shown in 650, by obtaining the data item from database storage, such as database storage 150 as disclosed in FIG. 1, processing the data item by a response processor, such as response processor 120 as disclosed in FIG. 1, to convert the data item from a database storage format to a transmission format and sending the data item in a transmission format to complete the access request. Should a matching cache entry be found, the received access request may be completed, as shown in 640, by sending the data item in a transmission format of the matching cache entry read from the transmission format cache. In some embodiments, the data item may be sent in a transmission format using a direct memory access (DMA) operation of a DMA interface, such as the DMA 2045 of network interface 2040 shown in FIG. 9 below, resulting in the matching cache entry being read from the transmission format cache and transmitted without copying the data into intermediate transmission buffers. Once the response is sent, the processing of the request is complete.

Figure 7:
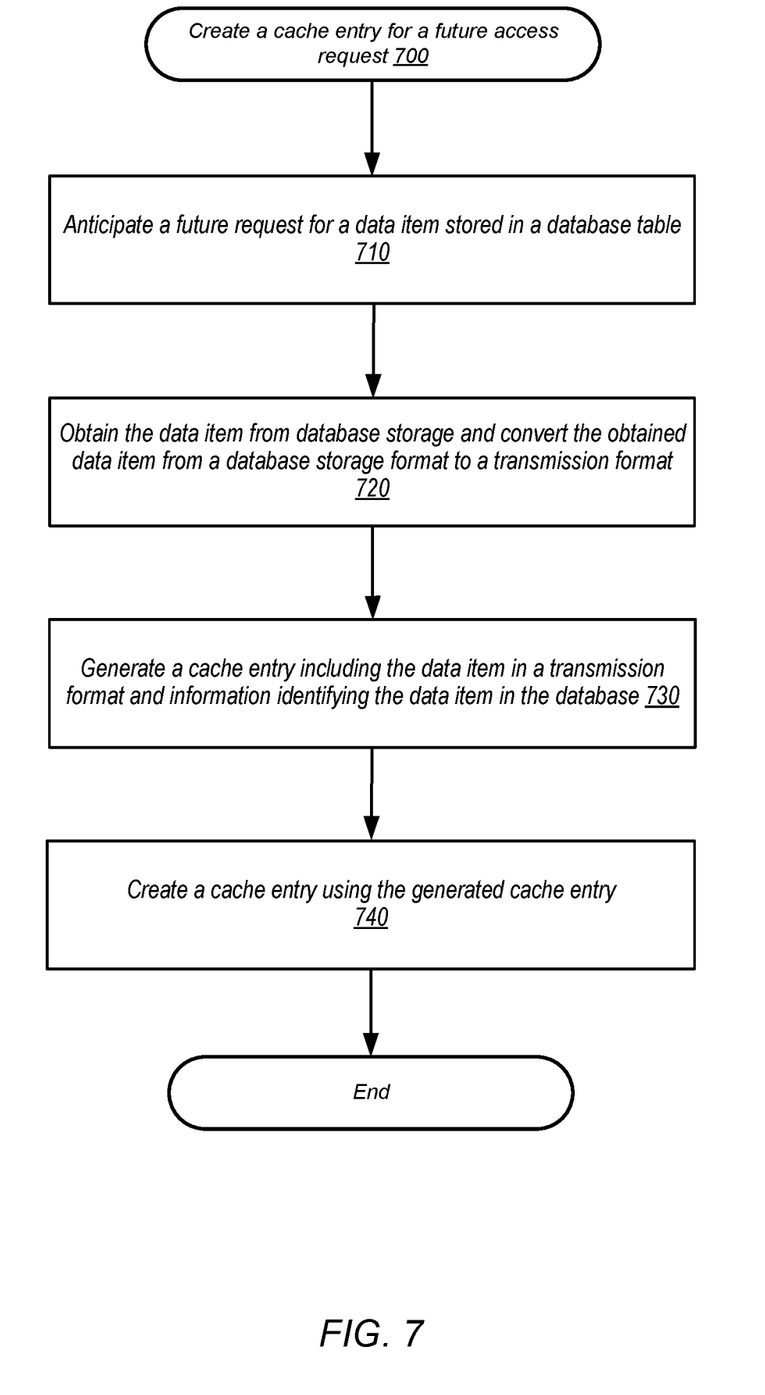
FIG. 7 is a high-level flowchart illustrating various methods and techniques to implement speculatively creating an entry in a transmission format cache, according to some embodiments.

FIG. 7 is a high-level flowchart illustrating various methods and techniques to implement speculatively creating an entry in a transmission format cache 700, according to some embodiments. As identified in 710, in some embodiments a database request processor, such as the database request processor 110 as disclosed in FIG. 1, may anticipate a future access request for a data item stored in a database table. As shown in 720, the database request processor may generate a data item 200 in the transmission format for this anticipated access request by speculatively reading the data item from database storage, such as the database storage 150 as disclosed in FIG. 1, and converting the data item from a database storage format to the transmission format.

As indicated on 730, once the data item in the transmission format is generated, the database request processor may in some embodiments generate a cache entry for the data item. This cache entry may include the data item in the transmission format as well as information to identify the data item of the database. In various embodiments, this information may include a variety of different kinds of information. In some embodiments, a database system, such as the database system 100 as disclosed in FIG. 1, may include a transmission format cache, such as the transmission format cache 140 as disclosed in FIG. 1, to support multiple database tables or partitions of multiple database table while in other embodiments the database system may include a transmission format cache to support a single database table or partition. Thus in various embodiments, the information may include, in addition to an identifier of the data item, additional identifiers of database tables or partitions. Furthermore, in some embodiments, the information may include an indicator such as a hash value that is computed based on one or more identifiers. Those skilled in the art will appreciate that these examples are merely illustrative and is not intended to limit the scope of the embodiments as described herein.

As indicated on 740, once a cache entry is generated, the database request processor may update the transmission format cache. In some embodiments, the transmission format cache may be implemented in a single portion of memory or storage on the database node while in other embodiments, the transmission format cache may implement separate memories for response storage and information storage. Therefore, updates of the transmission format cache in some embodiments may be implemented by storing information in a single region of memory or storage associated with a cache entry while in other embodiments locations in multiple memories may be performed. Those skilled in the art will appreciate that these examples are merely illustrative and is not intended to limit the scope of the embodiments as described herein. Once the transmission format cache has been updated, the cache entry has been created.

Figure 8:
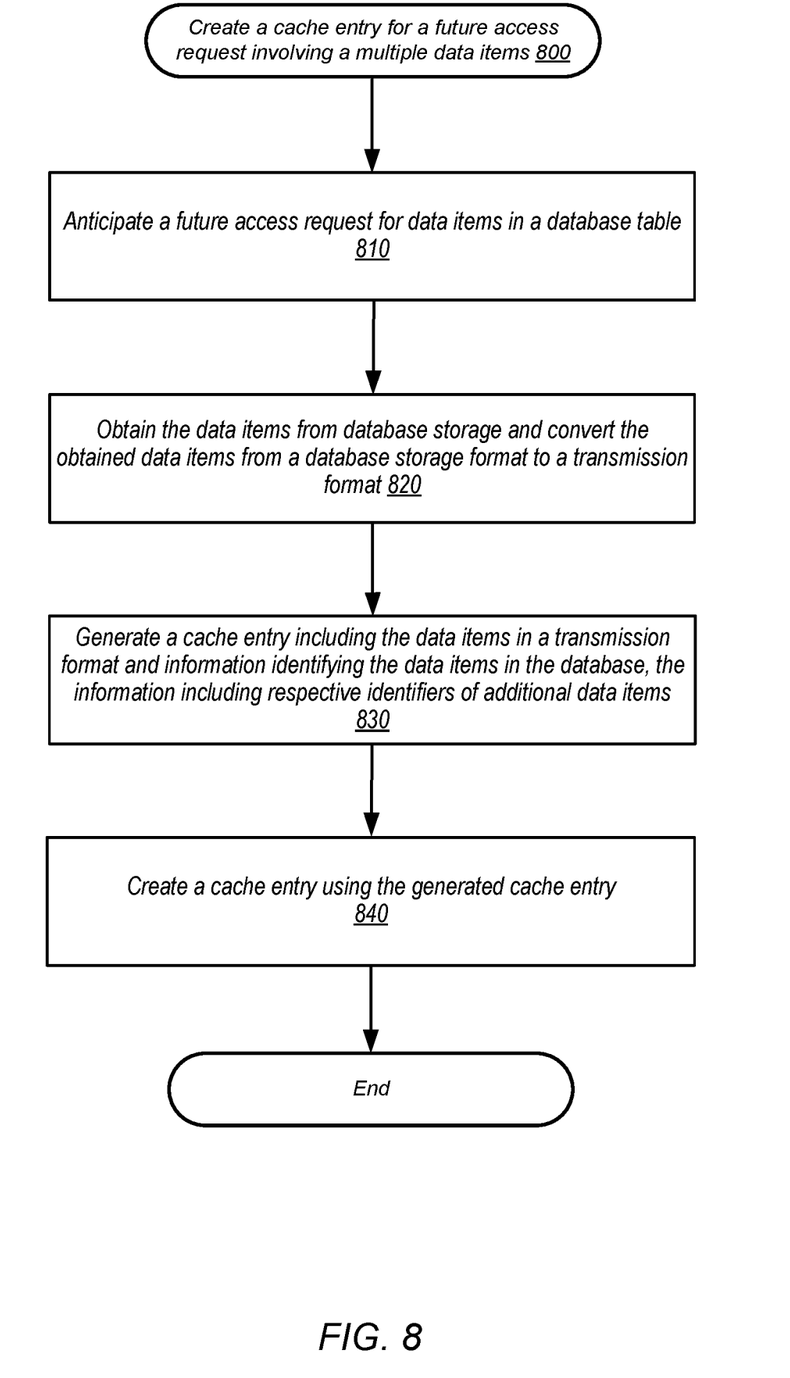
FIG. 8 is a high-level flowchart illustrating various methods and techniques to implement speculatively creating an entry in a transmission format cache for a plurality of data items, according to some embodiments.

FIG. 8 is a high-level flowchart illustrating various methods and techniques to implement speculatively creating an entry in a transmission format cache for a plurality of data items 800, according to some embodiments. As identified in 810, in some embodiments a database request processor, such as the database request processor 110 as disclosed in FIG. 1, may anticipate a future access request for multiple data items stored in a database table. As shown in 820, the database request processor may generate a current version of data items in the transmission format for this anticipated access request by speculatively reading the data items from database storage, such as the database storage 150 as disclosed in FIG. 1, and converting the data items from a database storage format to the transmission format.

As indicated on 830, once data items in a transmission format are generated, the database request processor may in some embodiments generate a cache entry for the data items. This cache entry may include the data items in a transmission format as well as information to identify the data items of the database. In various embodiments, this information may include a variety of different kinds of information. In some embodiments, a database system, such as the database system 100 as disclosed in FIG. 1, may include a transmission format cache, such as the transmission format cache 140 as disclosed in FIG. 1, to support multiple database tables or partitions of multiple database table while in other embodiments the database system may include a transmission format cache to support a single database table or partition. Thus in various embodiments, the information may include, in addition to at least one identifier of data items, additional identifiers of database tables or partitions. Furthermore, in some embodiments, the information may include an indicator such as a hash value that is computed based on one or more identifiers. Those skilled in the art will appreciate that these examples are merely illustrative and is not intended to limit the scope of the embodiments as described herein. In addition to information to identify the anticipated access request, in some embodiments, the information may also include identifiers to identify additional data items for which creation, deletion, or update operations may affect the cached data. In the event such operations were to be performed by the database request processor, the database request processor may use this additional information to update or invalidate the cache entry for the anticipated access response in some embodiments.

As indicated on 840, once a cache entry is generated, the database request processor may update the transmission format cache. In some embodiments, the transmission format cache may be implemented in a single portion of memory or storage on the database node while in other embodiments, the transmission format cache may implement separate memories for response storage and information storage. Therefore, updates of the transmission format cache in some embodiments may be implemented by storing information in a single region of memory or storage associated with a cache entry while in other embodiments locations in multiple memories may be performed. Those skilled in the art will appreciate that these examples are merely illustrative and is not intended to limit the scope of the embodiments as described herein. Once the transmission format cache has been updated, the cache entry has been created.

Embodiments to implement a transmission format cache in a database system or node as described herein may be executed on one or more computer systems, which may interact with various other devices. One such computer system is illustrated by FIG. 9. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, optionally using DMA 2045, and one or more input/output devices 2050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions, in one embodiment. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 2020 may store program instructions 2025 and/or data accessible by processor 2010, in one embodiment. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. A computer-accessible medium may include non-transitory storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040, in one embodiment.

In one embodiment, I/O interface 2030 may be coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000, in one embodiment. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000, in one embodiment. Multiple input/output devices 2050 may be present in computer system 2000 or may be distributed on various nodes of computer system 2000, in one embodiment. In some embodiments, similar input/output devices may be separate from computer system 2000 and may interact with one or more nodes of computer system 2000 through a wired or wireless connection, such as over network interface 2040.

As shown in FIG. 9, memory 2020 may include program instructions 2025 implementing the various embodiments of the systems as described herein, and data store 2035 comprising various data accessible by the program instructions 2025, in one embodiment. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 2000 may be transmitted to computer system 2000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a database node comprising at least one processor and memory, the database node configured to:
receive a first request to store an item as part of a database, and in response to receiving the first request:
store the item in storage according to a database storage format; and
store the item in a cache for the database in a transmission format different from the database storage format;
receive a second request over an application programming interface that causes the item, stored responsive to receiving the first request, to be returned in the transmission format, and in response to receiving the second request:
evaluate validity of the item in the cache to determine whether to perform a conversion of the item from the database storage format to the transmission format for transmission via the application programming interface;
responsive to a determination that the item in the cache is valid, return the item in the cache in the transmission format over the application programming interface; and
responsive to a determination that the item in the cache is not valid:
convert the item obtained from the storage from the database storage format to the transmission format; and
return the converted item in the transmission format over the application programming interface.

2. The system of claim 1, wherein the database node is further configured to:
responsive to receiving data to update the item:
generate the item in the database storage format based at least in part on the received data;
convert the item from the database storage format to the transmission format; and
perform the store of the item in the cache for the database in the transmission format.

3. The system of claim 1,
wherein to store the item in the cache for the database in the transmission format, the database node is configured to:
generate a cache entry comprising the item in the transmission format and information identifying the item as part of the database; and
update the cache to include the generated cache entry; and
wherein to evaluate validity of the item in the cache, the database node is configured to:
match information in the generated cache entry to information contained in the received second request.

4. The system of claim 1, wherein the database is at least a portion of a distributed database of a database service implemented using a plurality of database nodes including the database node, wherein the database service is offered by a provider network.

5. A method, comprising:
receiving a first request that causes an item to be stored as part of a database, and in response to receiving the first request:
storing the item in storage according to a first format;
storing the item in a cache for the database in a second format different from the first format;
receiving a second request that causes the item, stored responsive to receiving the first request, to be returned in the second format, and in response to receiving the second request:
if the item in the cache is determined to be valid for the second request, returning the item in the cache in the second format;
if the item in the cache is determined to be invalid for the second request:
converting the item obtained from the storage from the first format to the second format; and
returning the converted item in the second format.

6. The method of claim 5, further comprising:
responsive to receiving data to update the item:
generating the item in the first format based at least in part on the received data;
converting the item from the first format to the second format; and
performing the storing the item in the cache for the database in the second format.

7. The method of claim 5, further comprising:
responsive to receiving a request that causes a read of the item:
obtaining the item in the first format from the database;
converting the item from the first format to the second format; and
performing the storing the item in the cache for the database in the second format.

8. The method of claim 7, wherein the converting the item from the first format to the second format comprises encrypting the data item.

9. The method of claim 5, wherein storing the item in the cache is performed responsive to determining that the item is below a threshold size.

10. The method of claim 5, wherein storing the item in the cache comprises:
generating a cache entry comprising the item in the second format and information identifying the item as part of the database; and
updating the cache to include the generated cache entry; and
wherein determining that the cache is valid for the second request comprises:
matching information in the generated cache entry to information contained in the received second request.

11. The method of claim 5, wherein the database is a portion of a distributed database;
wherein the cache is one of a plurality of caches of a distributed database system implementing the database; and
wherein the plurality of caches provide eventually consistent reads for the database implemented by the distributed database system.

12. The method of claim 5, wherein the database is at least a portion of a distributed database of a database service implemented using a plurality of database nodes, wherein the database service is offered by a provider network and wherein the second request is received via a programmatic interface for the database service.

13. One or more non-transitory computer-accessible storage media storing program instructions that when executed on or across one or more processors cause the one or more processors to implement:
receiving a first request that causes an item to be stored as part of a database, and in response to receiving the first request:
storing the item in storage according to a first format;
storing the item in a cache for the database in a second format different from the first format;
receiving a second request that causes the item, stored responsive to receiving the first request, to be returned in the second format, and in response to receiving the second request:
evaluating validity of the item in the cache to determine whether to perform a conversion of the item from the first format to the second format;
responsive to a determination that the item in the cache is valid, returning the item in the cache in the second format; and
responsive to a determination that the item in the cache is not valid:
converting the item obtained from the storage from the first format to the second format; and
returning the converted item in the second format.

14. The one or more non-transitory computer-accessible storage media of claim 13, storing further program instructions that when executed on or across one or more processors cause the one or more computing devices to further implement:
responsive to receiving data to update the item:
generating the item in the first format based at least in part on the received data;
converting the item from the first format to the second format; and
and performing the storing the item in the cache for the database in the second format.

15. The one or more non-transitory computer-accessible storage media of claim 13, storing further program instructions that when executed on or across one or more processors cause the one or more computing devices to further implement:
responsive to receiving a request that causes a read of the item:
obtaining the item in the first format from the database;
converting the item from the first format to the second format; and
performing the storing the item at the cache for the database in the second format.

16. The one or more non-transitory computer-accessible storage media of claim 13, wherein storing the item at the cache is performed responsive to determining that the item is below a threshold size.

17. The one or more non-transitory computer-accessible storage media of claim 13, wherein, in storing the item at the cache, the program instructions cause the one or more computing devices to implement:
generating a cache entry comprising the item in the second format and information identifying the item as part of the database; and
updating the cache to include the generated cache entry; and
wherein, in evaluating validity of the item in the cache, the program instructions cause the one or more computing devices to implement:
matching information in the generated cache entry to information contained in the received second request.

18. The one or more non-transitory computer-accessible storage media of claim 13, wherein returning the item in the cache in the second format comprises transferring the item from the cache using a direct memory access operation.

19. The one or more non-transitory computer-accessible storage media of claim 13, wherein the database is a portion of a distributed database;
wherein the cache is one of a plurality of caches of a distributed database system implementing the database; and
wherein the plurality of caches provide eventually consistent reads for the database implemented by the distributed database system.

20. The one or more non-transitory computer-accessible storage media of claim 13, wherein the database is at least a portion of a distributed database of a database service implemented using a plurality of database nodes;
wherein the database service is offered by a provider network; and
wherein the second request is received via a programmatic interface for the database service.

* * * * *